United States Patent [19]

Yamamoto et al.

[11] Patent Number: 5,427,875
[45] Date of Patent: Jun. 27, 1995

[54] NON-AQUEOUS ELECTROLYTE SECONDARY CELL

[75] Inventors: Yoshikatsu Yamamoto, Fukushima; Shigeru Fujita, Tokyo; Hisayuki Kato, Fukushima, all of Japan

[73] Assignee: Sony Corporation, Tokyo, Japan

[21] Appl. No.: 962,583

[22] PCT Filed: Apr. 24, 1992

[86] PCT No.: PCT/JP92/00541
§ 371 Date: Dec. 28, 1992
§ 102(e) Date: Dec. 28, 1992

[87] PCT Pub. No.: WO92/20112
PCT Pub. Date: Nov. 12, 1992

[30] Foreign Application Priority Data

Apr. 26, 1991 [JP] Japan .................. 3-125303
May 2, 1991 [JP] Japan .................. 3-130682
Nov. 30, 1991 [JP] Japan .................. 3-341940

[51] Int. Cl.$^6$ .............................................. H01M 4/02
[52] U.S. Cl. ...................................... 429/223; 429/53; 429/57; 429/59; 429/218
[58] Field of Search ................. 429/53, 59, 223, 218

[56] References Cited

U.S. PATENT DOCUMENTS 4,913,988  4/1990  Langan ........................ 429/194
4,943,497  7/1990  Oishi et al. .................... 429/53

FOREIGN PATENT DOCUMENTS 0462575  12/1991  European Pat. Off. .
2508241  12/1982  France .
63-121260  5/1985  Japan .
62-256371  11/1987  Japan .
63-285871  11/1988  Japan .
349155  3/1991  Japan .
3127454  5/1991  Japan .

*Primary Examiner*—Stephen Kalafut
*Assistant Examiner*—M. Muzzolillo
*Attorney, Agent, or Firm*—Hill, Steadman & Simpson

[57] ABSTRACT

A non-aqueous liquid electrolyte secondary cell, in which $Li_xMO_2$, where M is at least one transition metal, preferably at least one of Co and Ni, with $0.05 \leq X \leq 1.10$, and in which charging and discharging is carried out by doping and release of lithium, is disclosed. The non-aqueous liquid electrolyte secondary cell has a current breaking device operated responsive to rise in the internal pressure in the cell. The current breaking device is adapted to be actuated positively by adding lithium carbonate to the active material of the positive electrode and providing the active material with surface portion covered with lithium carbonate. Preferably, the amount of addition and the specific surface area of lithium carbonate are 0.5 to 15 wt % and not less than 0.1 m$^2$/g, respectively.

8 Claims, 9 Drawing Sheets

NON-AQUEOUS ELECTROLYTE SECONDARY CELL

TECHNICAL FIELD

This invention relates to a non-aqueous electrolyte secondary cell having a lithium composite oxide as an active material for it positive electrode. More particularly, it relates to an improvement in the non-aqueous electrolyte secondary cell having current interrupting or breaking means.

BACKGROUND ART

Recently, with the progress in the electronic technology, the tendency is towards a higher performance, smaller size and portability of electronic equipment. In keeping up therewith, there is an increasing demand for a high energy density secondary cell employed for these electronic equipment. The secondary cells hitherto employed for these electronic equipment include nickel cadmium cells and lead cells. However, these cells are low in discharge potential and leave much to be desired in obtaining high energy density cells.

Recently, studies and investigations in a non-aqueous liquid electrolyte secondary cell employing a material capable of being doped with and releasing lithium ions, such as lithium, lithium alloys or a carbon material, and a lithium composite oxide, such as a lithium/cobalt composite oxide, as a negative electrode and as a positive electrode, respectively, are under way. These cells are excellent in cyclic properties and have high cell voltage and high energy density, while being subject to less self-discharge.

Meanwhile, in the case of a hermetically sealed cell, if the internal pressure in the cell is raised for some reason,the cell is abruptly/destroyed and either lose its function as the cell or cause damage to peripheral equipment. On the other hand, if the above-mentioned non-aqueous liquid electrolyte secondary cell is of the hermetically sealed structure, and the electric current flows in more than a predetermined quantity during charging, the cell voltage is increased to cause decomposition of the electrolyte and consequent gas evolution to raise the internal pressure in the cell. Besides, should the supercharged state persist, abnormal reactions, such as abrupt decomposition of the electrolyte or the active material, are occasionally produced to raise the cell temperature promptly. For combatting these disadvantages, an explosion-proof cell of the hermetically sealed structure has been proposed. This explosion-proof hermetically sealed cell has a current-interrupting device which is operated in response to increased internal pressure of the cell, as shown herein in FIG. 1.

With this cell having the current-interrupting device, if the supercharged state progresses to cause gas evolution due to chemical changes in the cell and consequent increase in the internal pressure in the cell, the current breaking device comes into operation with the rise in the internal pressure to interrupt the charging current. AS a result thereof, the progress of the abnormal reactions in the cell may be terminated to prevent an abrupt increase in the cell temperature of an increase in the internal pressure in the cell.

However, it has been found that, if a non-aqueous electrode secondary cell of the above-described explosion-proof type having a hermetically sealed structure is produced by using a material capable of being doped with or releasing lithium ions, such as lithium, lithium alloys or a carbon material, and a composite lithium oxide, such as a composite lithium/cobalt oxide, as a negative electrode and a positive electrode of the cell, respectively, and the cell is brought to a supercharged state, the cell occasionally undergoes abrupt heat evolution with an abrupt increase in temperature or a premature destruction.

As a result of our researches into the causes of the heat evolution with rapid temperature increase of the cell due to supercharging or premature destruction of the cell, the present inventors have found that heat evolution with a rapid increase in temperature and a premature destruction of the cell are produced before the internal pressure in the cell in increased appreciably. It is an object of the present invention to provide a non-aqueous liquid electrolyte secondary cell provided with a current interrupting device in which, even when the cell is supercharged, the current interrupting device comes positively into operation to prevent heat evolution with the abrupt increase in temperature or the premature destruction of the cell.

DISCLOSURE OF THE INVENTION

As a result of our eager searches towards accomplishing the above object, the present inventors have found that the current breaking means can be operated positively by adding 0.5 to 15 wt % of lithium carbonate to $Li_xMO_2$ as an active material of the positive electrode, where M is at least one transition metal, preferably at least one of Co and Ni, with $0.05 \leqq X \leqq 1,10$. The present inventors have also found that, by setting the specific surface area of lithium carbonate added to and mixed with the positive electrode so as to be not lower than 0.1 $m^2/g$, and by employing $Li_xMO_2$ having portions covered by lithium carbonate as a positive electrode, the current breaking means may be operated reliably, even in the case of supercharging with a higher charging current.

In accordance with the present invention, there is provided a non-aqueous liquid electrolyte secondary cell comprising a positive electrode having the composition of $Li_xMO_2$, where M is at least one transition metal preferably at least one of Co and Ni and $0.05 \leqq X \leqq 1.10$, as an active material, a negative electrode capable of being doped with and releasing lithium and current breaking means operated in response to a rise in the internal pressure within the cell, characterized in that lithium carbonate is added in an amount of 0.5 to 15 wt % to said positive electrode.

According to the present invention, the specific surface area of lithium carbonate is 0.1 $m^2/g$ or more, and $Li_xMO_2$ has portions covered with lithium carbonate.

By adding lithium carbonate to the positive electrode, the current breaking device may be operated reliably to break the charging current because heat evolution with rapid rise in temperature and premature destruction of the cell is not produced before the internal pressure in the cell is increased due to supercharging and the internal pressure in the cell is increased only gradually. Although the reason is not clarified, it may be presumed that, since lithium carbonate at the positive electrode is decomposed electro-chemically to yield carbonic gas, any abnormal reaction during supercharging is inhibited by carbonic gas, or the current breaking device is operated reliably by the carbonic gas for preventing heat evolution with rapid rise in temperature or premature destruction of the cell.

The reason the heat evolution with rapid rise in temperature and premature destruction of the cell due to supercharging may be prevented by increasing the specific surface area of lithium carbonate added to the positive electrode or by employing $Li_xMO_2$ having portions covered with lithium carbonate in case supercharging is carried out with a higher charging current may be analyzed in the following manner. If lithium carbonate in the positive electrode is small, the reaction area of lithium carbonate is diminished, so that, if the cell is supercharged with a high charging current, the reaction of decomposition of lithium carbonate is not produced in time so that an abnormal reaction tends to proceed within the cell. On the other hand, if lithium carbonate has low specific surface area, lithium carbonate itself undergoes polarization in the electrode to a larger extent even although the reactive surface is increased by simply increasing the amount of addition, so that the reaction of decomposition of lithium carbonate is not produced in time when a supercharged state is established in the electrode by the high charging current and consequently the abnormal reaction in the cell can not be inhibited. On the other hand, if the specific surface area of lithium carbonate is increased, the reactive surface of lithium carbonate is increased, while lithium carbonate undergoes polarization in the electrode to a lesser extent, so that, even if the cell is supercharged by the high charging current, decomposition of lithium carbonate occurs promptly to inhibit the abnormal reaction in the cell, as a result of which it becomes possible to prevent heat evolution with rapid rise in temperature and premature destruction of the cell.

It may also be presumed that, by employing $Li_xMO_2$ as an active material having portions covered with lithium carbonate, decomposition of lithium carbonate may proceed smoothly to promote carbonic gas evolution to inhibit the progress of the abnormal reaction in the cell to prevent heat evolution with rapid rise in temperature or premature destruction of the cell, because the effects comparable to increasing the specific surface of lithium carbonate may be expected in this case. The result is that a non-aqueous liquid electrolyte secondary cell having a high energy density and superior cyclic properties with high safety factor may be provided with markedly high commercial and industrial values.

BEST MODE FOR CARRYING OUT THE INVENTION

According to the present invention, an active material containing $Li_xMO_2$, where M is one or more of transition metals, preferably at least one of Co and Ni, $0.05 \leq X \leq 1.10$, is employed as a positive electrode. Examples of these active materials include composite oxides such as $LiCoO_2$, $LiNiO_2$, $LiNi_y$ and $Co_{(1-y)}O_2$, where $0.05 \leq X \leq 1.10$ and $0 < y < 1$. These composite oxides are produced by mixing carbonates of e.g. lithium, cobalt and nickel as starting materials according to compositions and sintering the resulting mixture at 600° to 1000° C. in an oxygen-containing atmosphere. The starting material is not limited to carbonates, but hydroxides and oxides may similarly be employed for synthesis.

On the other hand, a carbon material is employed as a negative electrode. However, any other suitable material capable of being doped with or releasing lithium may also be employed, such as thermally decomposed carbon, cokes, e.g. pitch coke, needle coke or petroleum coke, graphite, vitreous carbons, sintered organic high molecular compounds, e.g. phenol or furan resins carbonized by sintering at a suitable temperature, carbon fibers, activated carbon, metal lithium or lithium alloys, e.g. lithium-aluminum alloys. Besides, polymers such as polyacetylene or polypyrrole may also be employed.

As an electrolyte solution, an electrolyte solution in which a lithium salt as an electrolyte is dissolved in an organic solvent, by way of an example, is employed. Although there is no limitation to the organic solvents employed, propylene carbonate, ethylene carbonate, 1,2-dimethoxyethane, γ-butyllactone, tetrahydrofuran, 2-methyltetrahydrofuran, 1,3-dioxolane, sulfolane, acetonitrile, diethyl carbonate, dipropyl carbonate or di propyl carbonate, may be used alone or as a mixture.

As an electrolyte, $LiClO_4$, $LiAsF_6$, $LiPF_6$, $LiBF_4$, $LiB(C_6H_5)_4$, $LiCl$, $LiBr$, $CH_3SO_3Li$, $CF_3SO_3 Ll$ or $CF_3SO_3Li$, may be employed.

Figure 1:
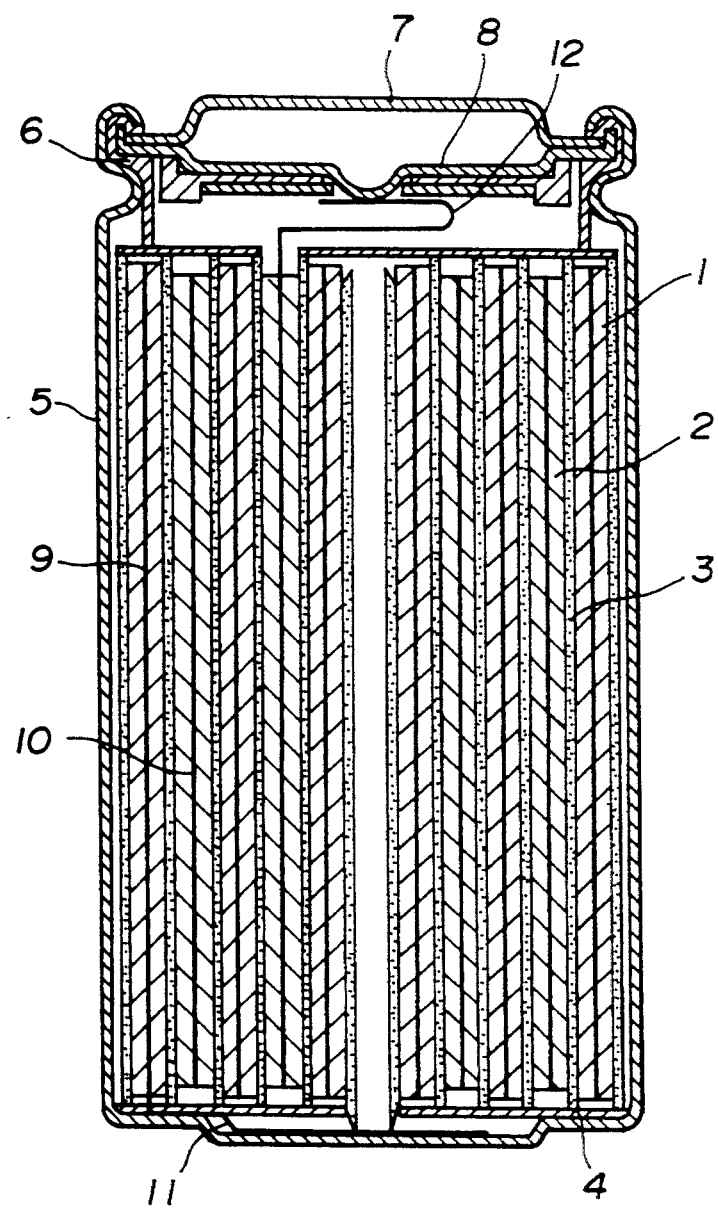
FIG. 1 is a cross-sectional view showing an illustrative construction of a non-aqueous liquid electrolyte secondary cell to which the present invention is applied.

The current-breaking device for a cell, shown in and described in connection with FIG. 1, may be employed as the current-interrupting means. However, this is not limitative and any other suitable device capable of interrupting the current depending on the internal pressure of the cell may also be employed.

The present invention will be explained with reference to Examples and Comparative Examples.

EXAMPLE 1

For synthesizing the active material for the positive electrode ($LiCoO_2$), lithium carbonate and cobalt carbonate were mixed together at an Li/Co. molar ratio of 1 and the resulting mixture was sintered in air at 900° C. for five hours. X-ray diffractometry indicated satisfactory coincidence of the resulting material with $LiCoO_2$ in the JCPDS card. On quantitation, lithium carbonate was substantially not detected in the active material for the positive electrode, and amounted to 0%. The resulting material was subsequently pulverized, using an automatic mortar, to produce $LiCoO_2$.

Meanwhile, the amount of lithium carbonate in the active material for the positive electrode was found by calculation from the amount of $CO_2$ quantitated by titration with a standard hydrochloric acid solution of $CO_2$ which was yielded by decomposing a specimen with sulfuric acid and which was introduced and absorbed in a solution of barium hydroxide and sodium hydroxide.

Lithium carbonate having a specific surface area of 0.05 $m^2$/g was added to and mixed with $LiCoO_2$, produced in the above-described manner, to produce a mixture consisting of 99.5 wt % of $LiCoO_2$ and 0.05 wt % of lithium carbonate. 91 wt % of the resulting mixture, 6 wt % of graphite as an electrically conductive material and 3 wt % of polyvinylidene fluoride as a binder were mixed together to form a positive electrode material which was dispersed in N-methyl-2-pyrolidone to form a slurry. This slurry was coated on both surfaces of a band-shaped aluminum foil functioning as a positive electrode current collector 10. The resulting product was dried and compression molded by a roller press to form a positive electrode 2.

For producing the active material for the negative electrode, petroleum pitch was used as a starting material, into which 10 to 20% of oxygen-containing functional groups were introduced by way of so-called oxygen cross-linking. The resulting mass was sintered at 1000° C. in an inert gas to produce a carbon material which could be graphitized difficulty and which exhibit properties comparable to those of vitreous carbon. X-ray diffractometry indicated that this material has a plane-to plane distance of the (002) planes of 3.76Å and a true specific gravity of 1.58. 90 wt % of the carbon material produced in this manner and 10 wt % of polyvinylidene fluoride as a binder were mixed to form a negative electrode material which was dispersed in N-methyl-2-pyrolidone to form a slurry. This slurry was coated on both sides of a band-shaped copper foil, functioning as a negative electrode current collector. The resulting product was dried and compression molded by a roller press to form a negative electrode 1.

The band-shaped positive electrode 2 and negative electrode 1 and a separator 3 of a porous polypropylene film with a pore size of 25 μm, were stacked and spirally coiled a number of times to form a coiled product.

An insulator 4 was inserted on the bottom of a nickel-plated iron cell can 5 into which the coiled product was housed so as to rest on the insulator 4. By way of current collection at the negative electrode, an end of a negative electrode lead 11 was pressed onto the negative electrode 1, while its other end was welded to a cell can 5. On the other hand, by way of current collection at the positive electrode, one end of a positive lead 12 of aluminum was attached to the positive electrode 2, while its other end was welded to a cell lid 7 fitted with a current-breaking device 8, adapted for breaking the current depending on the internal pressure in the cell.

Figure 2:
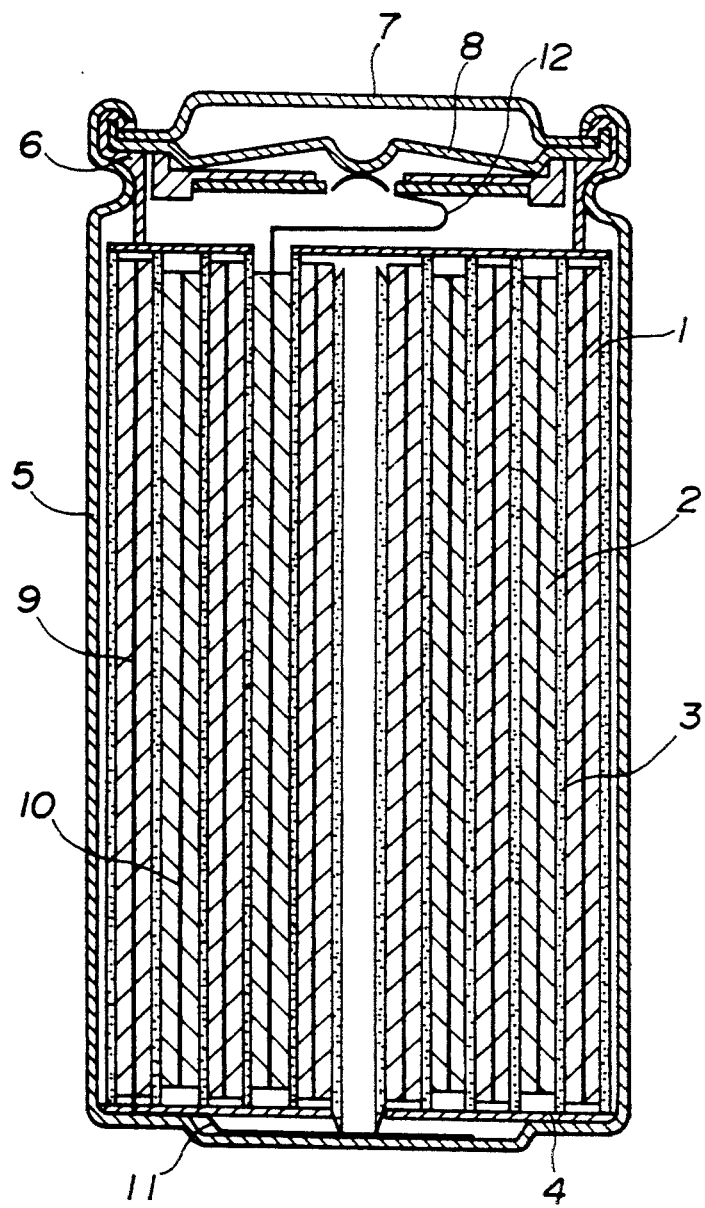
FIG. 2 is a cross-sectional view sowing the state following the actuation of the current breaking device.
Figure 3:
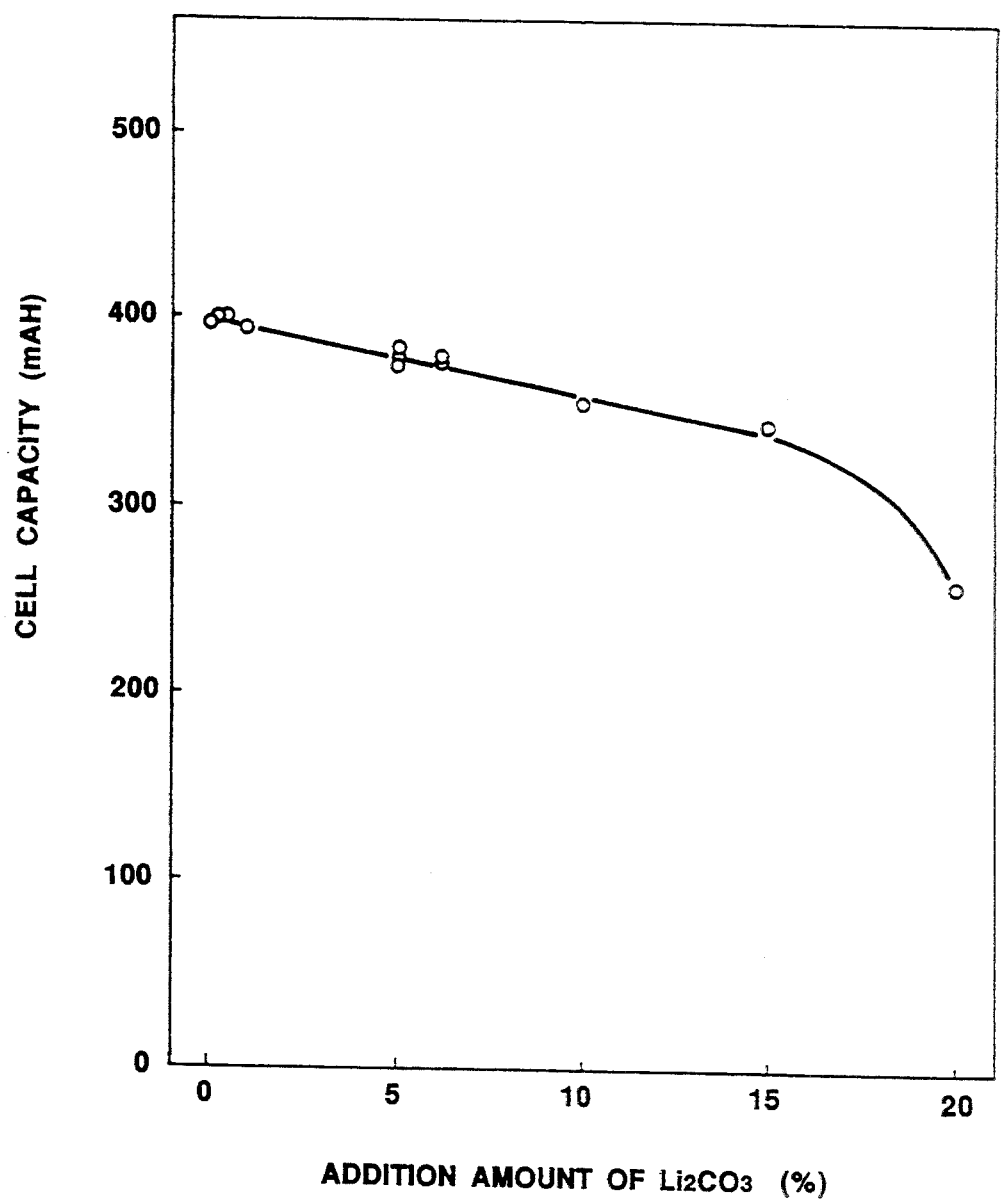
FIG. 3 is a graph showing the relation between the amount of addition of lithium carbonate and the cell capacity.

An electrolytic solution, obtained by dissolving 1 mol of $LiPF_6$ in a mixed solvent of 50 wt % of propylene carbonate and 50 wt % of diethyl carbonate, was charged into the cell can 5. The cell can 5 was caulked by an insulating sealing gasket 6 coated with asphalt to secure the cell lid 7 to produce a cylindrical cell having a diameter of 14 mm and a height of 50 mm, as shown in FIG.1. The state of the cell after coming into operation of the current breaking device 8 is shown in FIG. 2.

EXAMPLE 2 to 7

A cylindrical cell was produced in the same way as in Example 1 except using $LiCoO_2$ and lithium carbonate as in Example 1 but with different amounts of addition of lithium carbonate as shown in Table 1.

TABLE 1

|  | Amounts of Lithium Carbonate (wt %) | Specific Surface Area of Lithium Carbonate ($m^2$/g) |
| --- | --- | --- |
| Ex. 1 | 0.5 | 0.05 |
| Ex. 2 | 1.0 | 0.05 |
| Ex. 3 | 5.0 | 0.05 |
| Ex. 4 | 6.2 | 0.05 |
| Ex. 5 | 10.0 | 0.05 |
| Ex. 6 | 15.0 | 0.05 |
| Ex. 7 | 20.0 | 0.05 |
| Ex. 8 | 5.0 | 0.10 |
| Ex. 9 | 5.0 | 0.15 |
| Ex. 10 | 5.0 | 0.34 |
| Ex. 11 | 5.0 | 0.52 |
| Ex. 12 | 5.0 | 1.01 |
| Ex. 13 | 5.0 | 1.95 |
| Ex. 14 | 5.0 | 5.10 |
| Ex. 15 | 6.2 | — |
| Ex. 16 | 6.2 | — |
| Comp. Ex. 1 | 0 | 0.05 |
| Comp. Ex. 2 | 0.2 | 0.05 |

EXAMPLES 8 to 14

A cylindrical cell was produced in the same way as in Example 1 except adding and mixing lithium carbonate of Table 1 having a different specific surface area to $LiCoO_2$ employed in Example 1 and using a mixture consisting of 95 wt % of $LiCoO_2$ and 5.0 wt % of lithium carbonate.

EXAMPLE 15

Lithium carbonate and cobalt carbonate were mixed at an Li/Co molar ratio of 1.5 and the resulting mixture was sintered in air at 900° C. for five hours. X-ray diffractometry indicated that this active material for positive electrode was a mixture of $LiCoO_2$ and lithium carbonate. Lithium carbonate in the active material of the positive electrode was quantitated to be 6.2 wt %. The mixture was subsequently pulverized using an automatic mortar. 91 wt % of the active material thus produced, 6 wt % of graphite as an electrically conductive material and 3 wt % of polyvinylidene fluoride as a binder were mixed together to form a positive electrode material. A cylindrical cell was produced in the same way as in Example 1 except using this positive electrode material.

EXAMPLE 16

93.8 wt % of $LiCoO_2$ employed in Example 1 and 6.2 wt % of lithium carbonate having a specific surface area of 0.5 $m^2$/g were mixed thoroughly and again sintered in air at 750° C. for five hours, After sintering, lithium carbonate in this active material for the positive electrode was quantitated to be 6.2 wt %. The active material was subsequently pulverized using an automatic mortar. 91 wt % of the active material of this positive electrode, 6 wt % of graphite as an electrically conductive material and 3 wt % of polyvinylidene fluoride as a binder were mixed to form a positive electrode material. A cylindrical cell was produced in the same way as in Example 1 except using this positive electrode material.

Comparative Example 1

91 wt % of $LiCoO_2$, produced in Example 1,. 6 wt % of graphite, as an electrically conductive material and 3 wt % of polyvinylidene fluoride were mixed to form a positive electrode material. A cylindrical cell was produced in the same way as in Example 1 except using this positive electrode material.

Comparative Example 2

91 wt % of a mixture consisting of 98 wt % of $LiCoO_2$ produced in Example 1 and 0.2 wt % of lithium carbonate, 6 wt % of graphite, as an electrically conductive material and 3 wt % of polyvinylidene fluoride were mixed to form a positive electrode material. A cylindrical cell was produced in the same way as in Example 1 except using this positive electrode material.

Meanwhile, lithium carbonate employed in Examples 1 to 14 and Comparative Example 2 was adjusted by changing the time of pulverization and the amount of lithium carbonate charged into a ball mill at the time of pulverization of a lump of lithium carbonate in the ball mill. The specific surface area of lithium carbonate was measured using a BET one-point method.

20 samples each of the cells of the above Examples and Comparative Examples were tested as to the frequency of occurrence of rejects caused by heat evolution with rapid temperature rise of the cells and premature destruction of the cells caused in turn by bringing the samples to a supercharged state at a current of 1.5 A. The results are shown in Table 2.

TABLE 2

| | Rate of Occurrence of Damages (%) | | initial capacity (mAh) |
|---|---|---|---|
| | charging current 1.5A | charging current 3.7A | |
| Cell of Ex. 1 | 0 | 90 | 400 |
| Cell of Ex. 2 | 0 | 90 | 396 |
| Cell of Ex. 3 | 0 | 90 | 386 |
| Cell of Ex. 4 | 0 | 95 | 384 |
| Cell of Ex. 5 | 0 | 70 | 356 |
| Cell of Ex. 6 | 0 | 50 | 344 |
| Cell of Ex. 7 | 0 | 50 | 260 |
| Cell of Ex. 8 | 0 | 0 | 384 |
| Cell of Ex. 9 | 0 | 0 | 383 |
| Cell of Ex. 10 | 0 | 0 | 378 |
| Cell of Ex. 11 | 0 | 0 | 380 |
| Cell of Ex. 12 | 0 | 0 | 377 |
| Cell of Ex. 13 | 0 | 0 | 381 |
| Cell of Ex. 14 | 0 | 0 | 378 |
| Cell of Ex. 15 | 0 | 0 | 380 |
| Cell of Ex. 16 | 0 | 0 | 381 |
| Cell of comp. Ex. 1 | 100 | 100 | 396 |
| Cell of comp. Ex. 2 | 80 | 100 | 400 |

Except the cells of the Comparative Examples 1 and 2, heat evolution with rapid rise in temperature or premature destruction of the cells could be eliminated by adding 0.5 wt % or more of lithium carbonate to the positive electrode, as shown in Table 2. However, it is seen from FIG.2 that an amount of addition of lithium carbonate exceeding 15 wt % leads to increased lowering of the cell capacity. This is probably due to the fact that, since lithium carbonate has a low electrical conductivity, if lithium carbonate is added in an amount exceeding 15 wt %, the internal resistance of the cell is increased to lower load characteristics. Thus it has been found that the amount of addition of lithium carbonate in a range of from 0.5 to 15 wt % is desirable.

For investigation into the aspect of safety at a higher charging current, 20 samples each of the above Examples and Comparative Examples were supercharged at 3.7 A to check for the frequency of occurrences of rejects caused by heat evolution with rapid rise in temperature of premature destruction of the cells. The results are shown in Table 2.

It is seen from Table 2 that, when the samples of the cells of Examples 8 to 16 were supercharged at a higher charging current of 3.7 A, these samples were exempt from heat evolution with rapid rise in temperature or premature destruction in the supercharged state.

This means that, by setting the specific surface area of lithium carbonate added to the positive terminals so as to be not lower than 0.1 m²/g, it becomes possible to prevent heat evolution with rapid rise in temperature of premature destruction of the cells in the supercharged state, insofar as the cells of Examples 8 to 16 are concerned.

In view of the above, investigations were made into the active material of the positive electrode of Example 4 and the active materials of the positive electrodes of Examples 15 and 16 in which a difference was produced in safety as compared to the remaining Examples.

Figure 4:
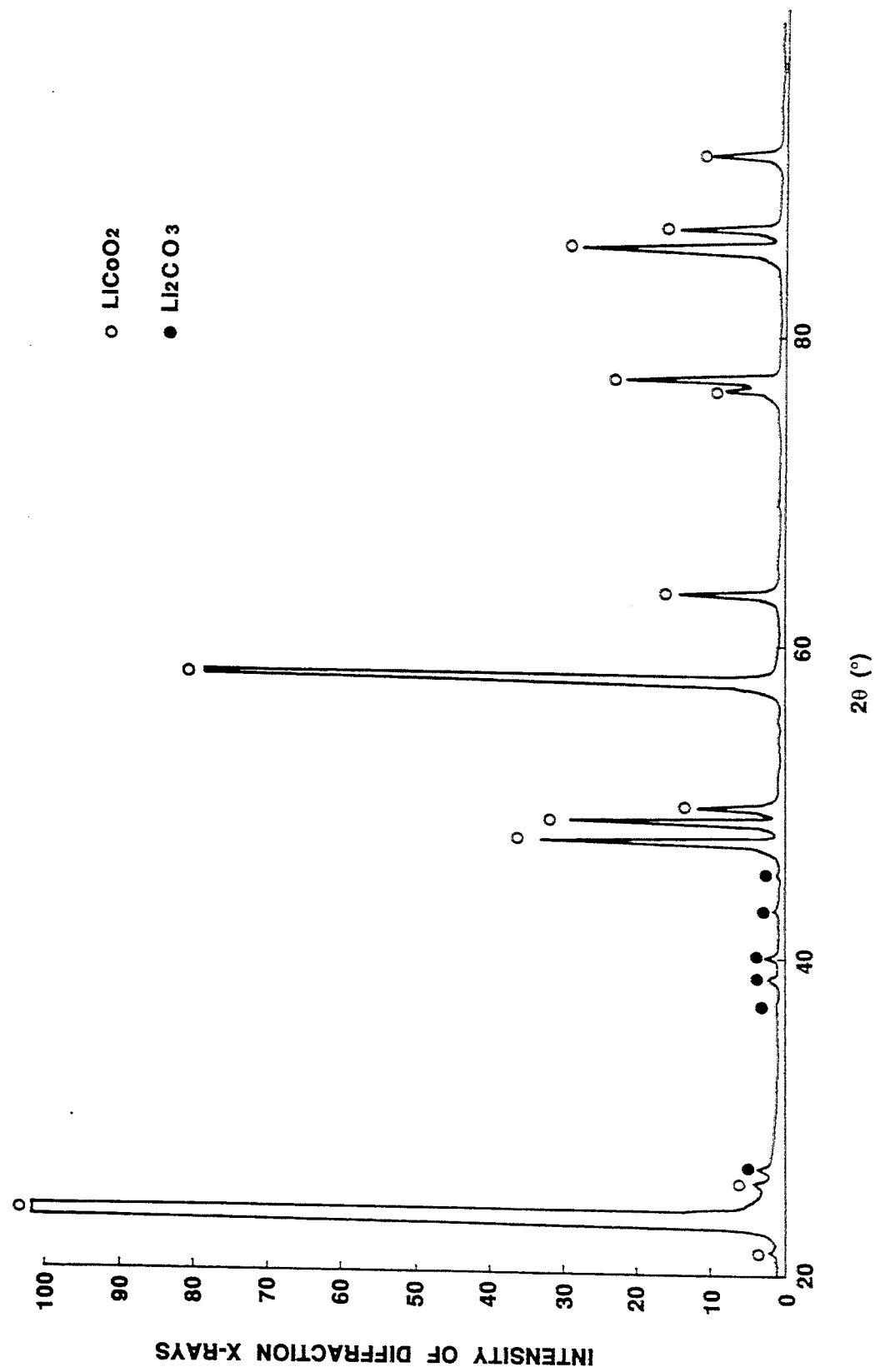
FIG. 4 is an X-ray diffraction spectrum of an active material of a positive electrode in which lithium carbonate is left in a non-reacted state at the time of synthesis of the active material.
Figure 5:
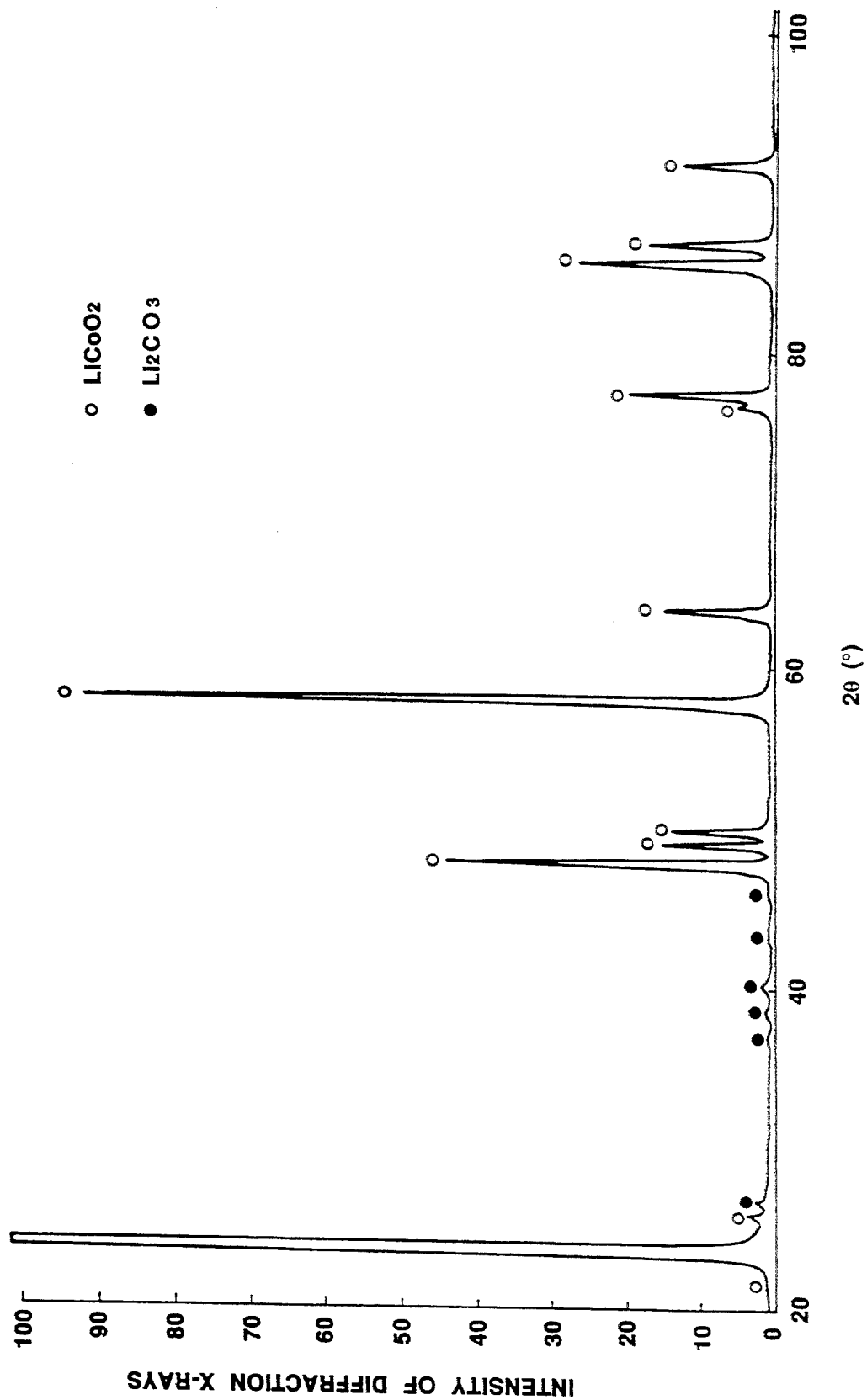
FIG. 5 is an X-ray diffraction spectrum of an active material of a positive electrode in which lithium carbonate is mixed after synthesis of the active material.

FIGS. 4 and 5 are X-ray diffraction diagrams of the active materials of the positive electrodes in which lithium carbonate was left in a non-reacted state during synthesis of the active material of Example 15 and lithium carbonate was mixed after synthesis of the active material of Example 4. In FIGS. 4 and 5, there was no marked difference in the X-ray diffraction diagrams which indicated each a mixture of $LCoO_2$ and lithium carbonate.

Surface analyses of microsized regions were then carried out using an EDX elemental analysis device produced by KEVEX Inc. The results are shown in FIGS. 6 to 9. It is seen from FIG. 6 that Co spectrum was outstandingly manifested in the active material of the positive electrode of Example 4 in which lithium carbonate was mixed after synthesis of the active material.

Figure 6:
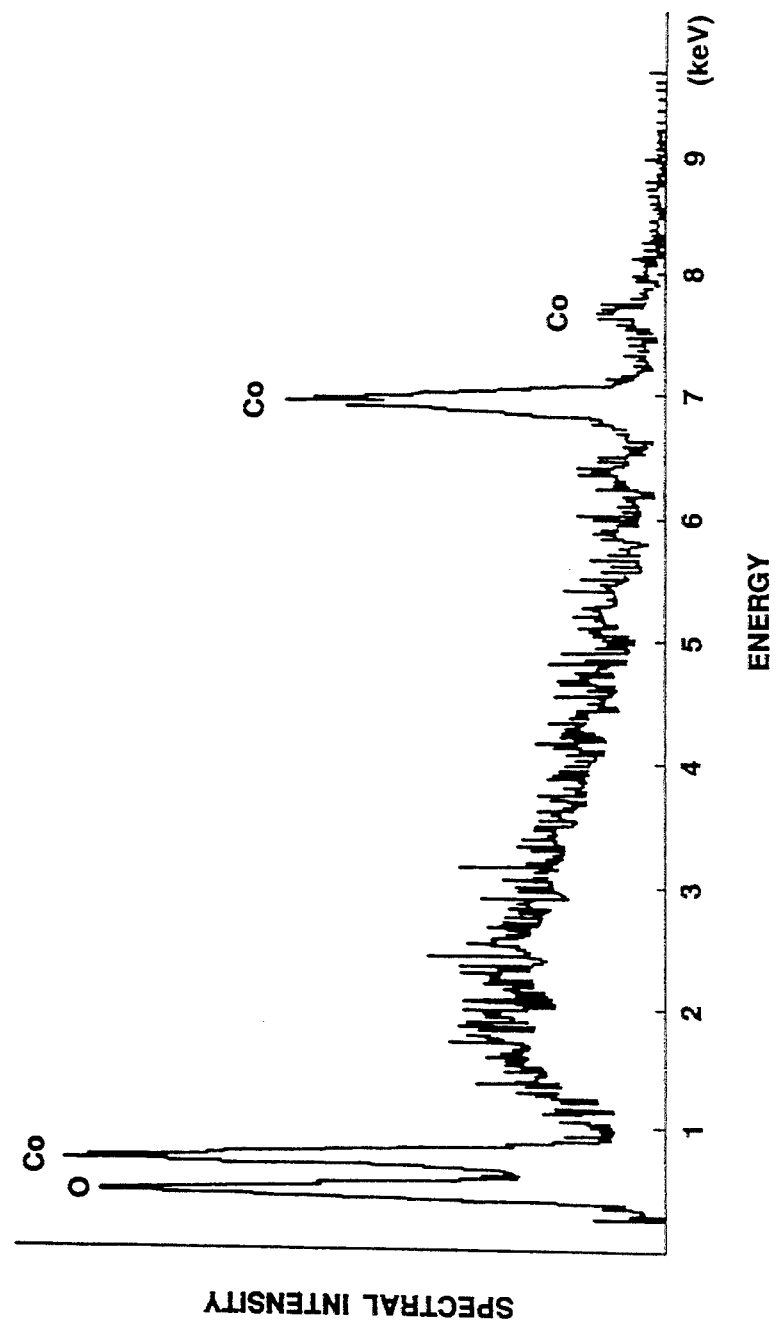
FIG. 6 is a graph showing EDX elementary analyses of an active material in which lithium carbonate is mixed after synthesis of the active material.
Figure 7:
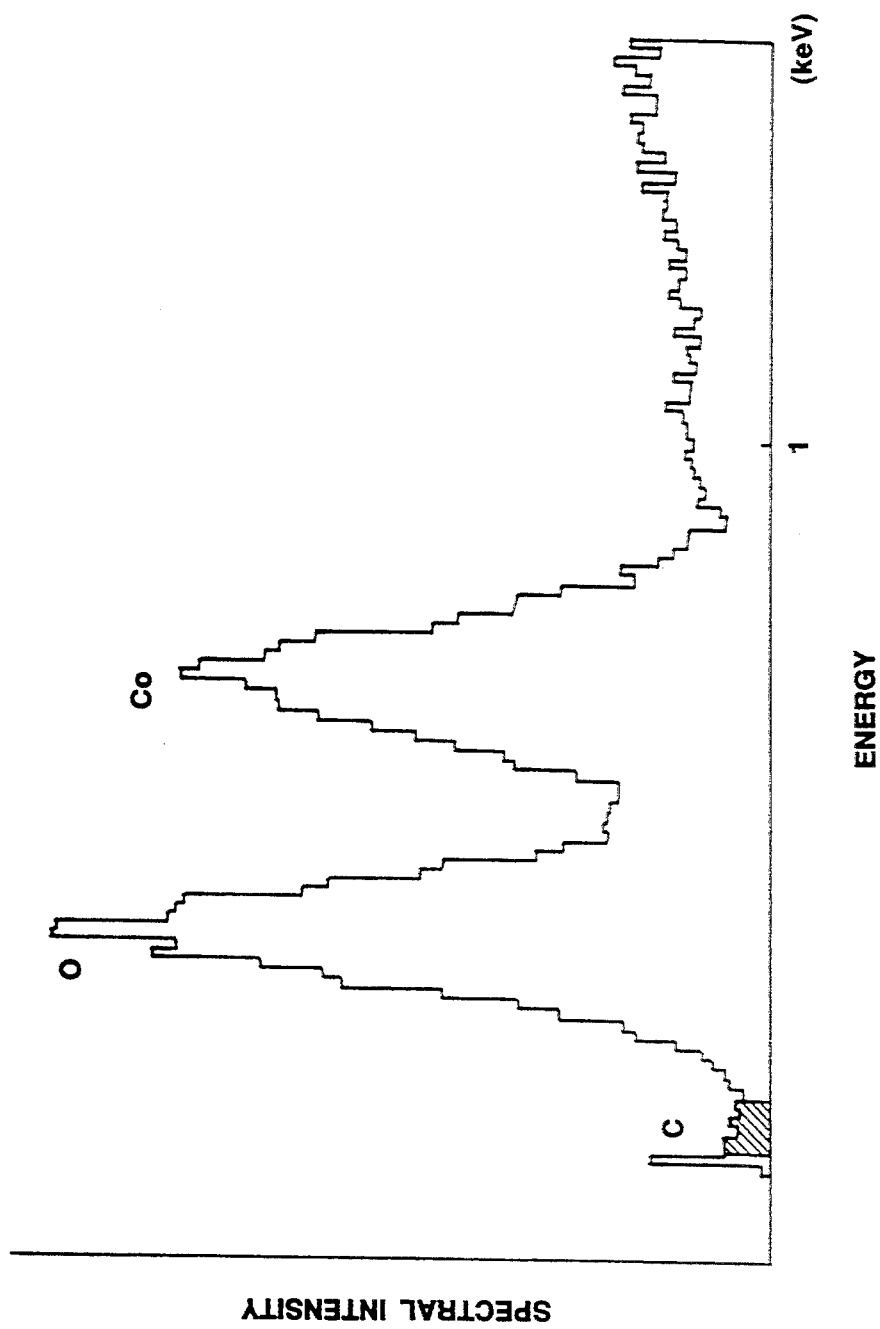
FIG. 7 is a graph showing EDX elementary analysis for particle surface regions demonstrating the Co spectrum.
Figure 8:
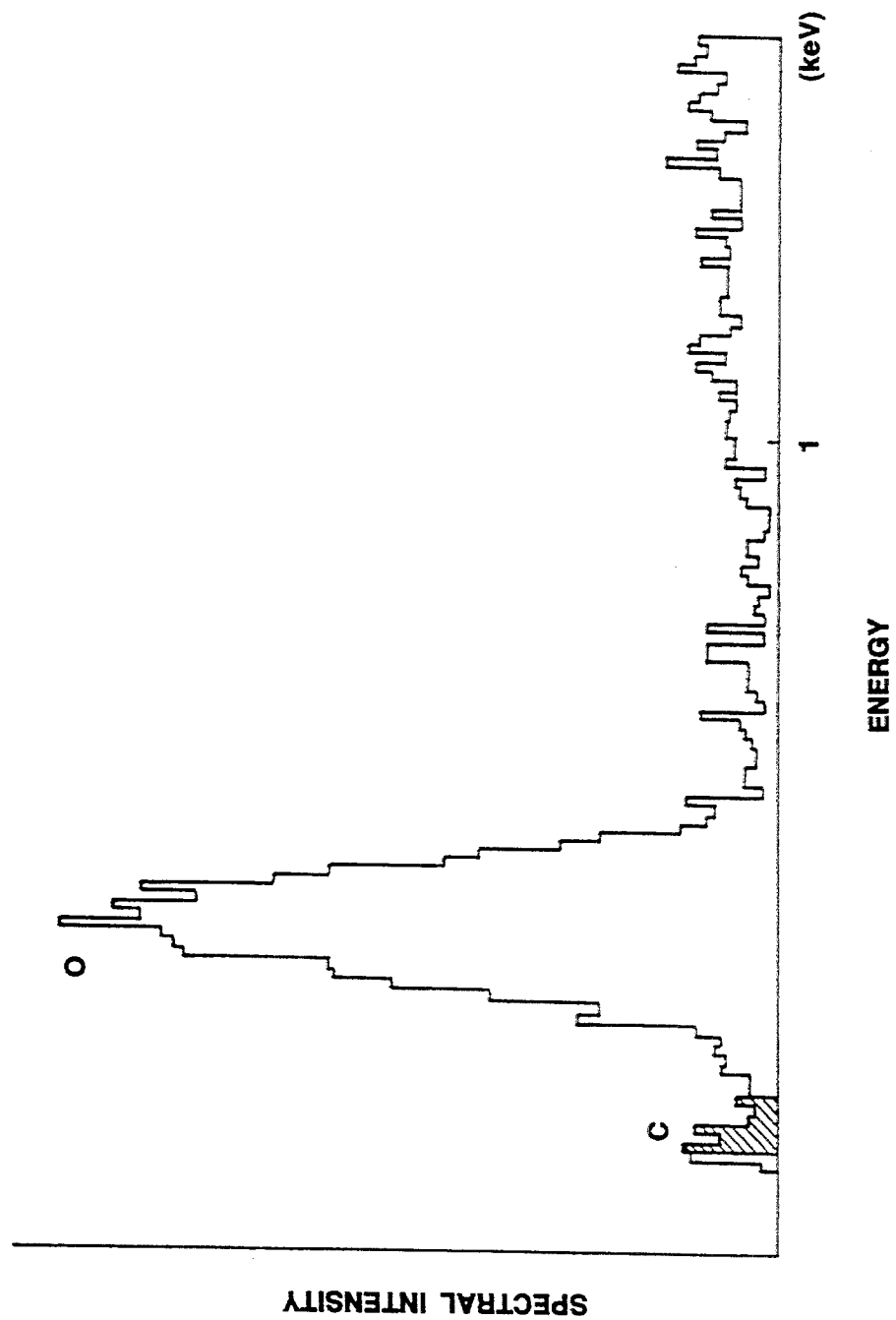
FIG. 8 is a graph showing EDX elementary analysis for particle surface regions not demonstrating the Co Spectrum.

It is seen from FIG. 6 that, in the active material of the positive electrode of Example 4 in which lithium carbonate was mixed after synthesis of the active material, the Co spectrum was manifested outstandingly, and that, on elemental analyses for individual particles, there are particle regions which demonstrated the Co spectrum (FIG. 7) for $LiCoO_2$ and which failed to demonstrate the Co spectrum (FIG. 8) for lithium carbonate. Consequently, it may be concluded that $LiCoO_2$ and lithium carbonate co-existed in isolation form each other.

Figure 9:
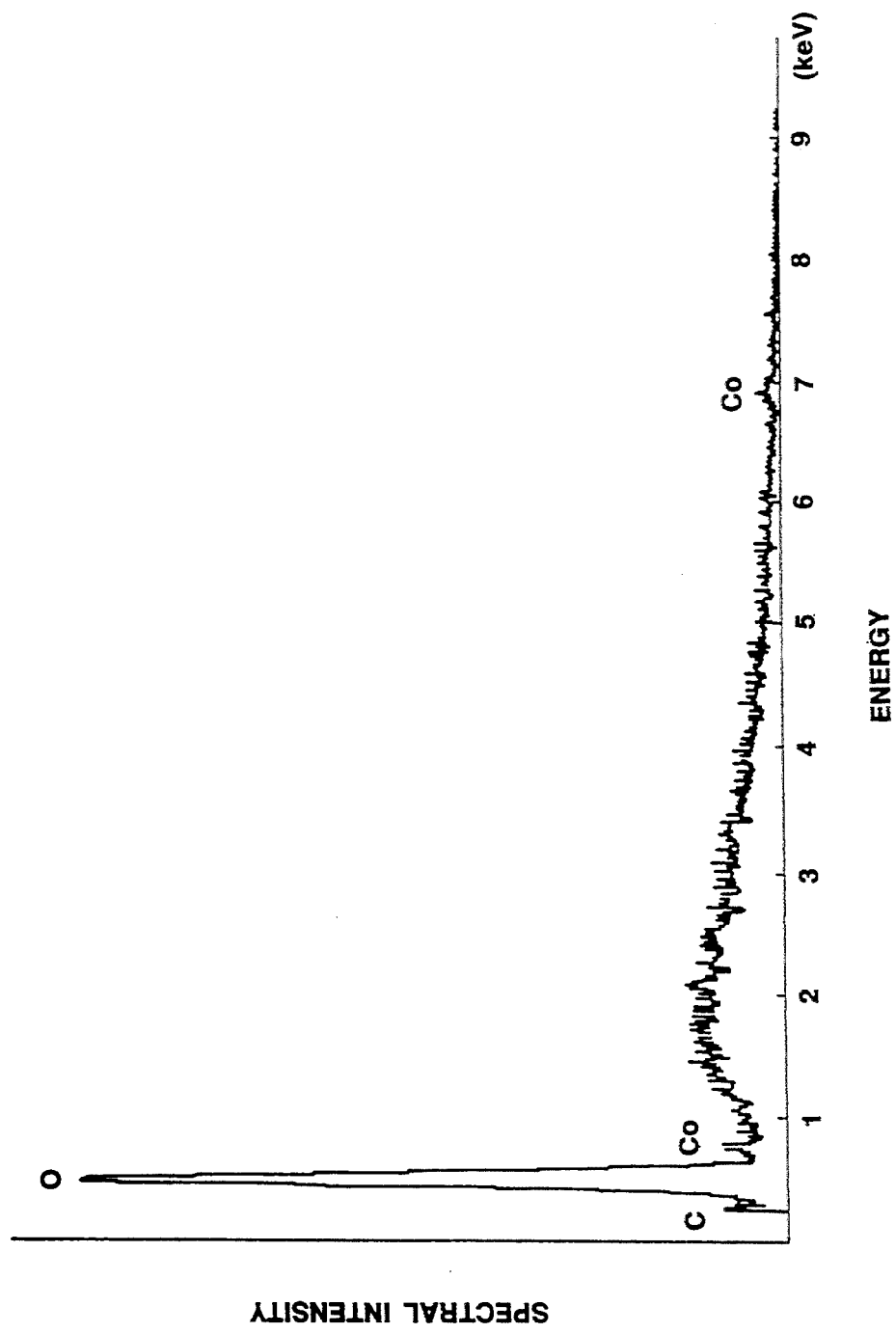
FIG. 9 is a graph showing EDX elementary analysis for the active material of the positive electrode in which lithium carbonate is left in a non-reacted state at the time of synthesis of the active material.

It is also seen from FIG. 9 that, as for the active material of the positive electrode of Example 15 in which lithium carbonate is left in the non-reacted state during synthesis of the active material, the spectrum of Co for $LiCoO_2$ is not manifest and exhibits only a low peak intensity, and that, on elementary analyses for individual particles, marked changes in spectrum of Co, as was encountered with the active material of the positive electrode of Example 4, were not observed despite slight changes in intensity of the Co spectrum. It is seen from this that, in the active material of the positive electrode, in which lithium carbonate was left in the non-reacted state during synthesis of the active material, lithium carbonate was present in the state of partially covering the surface of $LiCoO_2$, in distinction from the above-mentioned case of Example 4 in which LiCoO$_2$ and lithium carbonate co-exist in a separate state from each other. Consequently, the Co spectrum corresponding to LiCoO$_2$ is not manifested outstandingly and the peak intensity is lowered. On the other hand, the X-ray diffraction diagrams and the results of EDX of Example 16 for the active material of the positive electrode in which lithium carbonate was mixed after synthesis of the active material and lithium carbonate was re-melted after synthesis of the active material at 750° C. were the same as those of Example 15. For this reason, it is seen that, with the active material of the positive electrode, in which lithium carbonate was mixed after synthesis of the active material and lithium carbonate was re-melted after synthesis of the active material at 750° C., lithium carbonate exists in the state of covering the surface of LiCoO$_2$, as in the case of the active material of the positive electrode of Example 15 in which lithium carbonate was left during synthesis of the active material.

It follows from this that the difference of the active material of the positive electrode of Example 15 from that of Example 16 consists in the state of presence of lithium carbonate in the positive electrode and that, in the state of Examples 15 and 16, in which lithium carbonate covers the surface of LiCoO$_2$, it becomes possible to prevent heat evolution with rapid rise in temperature and premature destruction of the cell even if the cell is supercharged with a higher current, rather than in the state of Example 4 in which LiCoO$_2$ simply co-exists with lithium carbonate.

It is noted that, as means for covering LiCoO$_2$ with lithium carbonate, means for leaving lithium carbonate in the non-reacted state during synthesis of the active material and means for mixing lithium carbonate after synthesis of the active material and re-melting lithium carbonate at 750° C. were used in the above Examples. However, any other suitable means may be employed for covering LiCoO$_2$ with lithium carbonate.

Although LiCoO$_2$ is used as the active material of the positive electrode, similar effects may be produced with other active materials of the positive electrodes, such as, for example, Li$_x$Ni$_y'$Co$_{(1-y)}$O$_2$, where $0.05 \leq y \leq 1.10$ and $0 < y < 1$.

It is seen from above that, by adding 0.5 to 15 wt % of lithium carbonate to the positive material in the non-aqueous liquid electrolyte secondary cell equipped with current breaking means, the current breaking device comes positively into operation even if the cell is supercharged, so that abnormal reactions in the cell caused by supercharging may be inhibited to prevent heat evolution with rapid rise in temperature and premature destruction of the cell. In the case of supercharging with a higher charging current, the abnormal reactions occurring in the cell may be inhibited by setting the specific surface area of lithium carbonate added and mixed to the positive terminal to 0.1 m$^2$/g or higher of by employing LiCoO$_2$ partially covered by lithium carbonate as the positive electrode to prevent heat evolution with rapid rise in temperature of premature destruction of the cell. The result is that a non-aqueous liquid electrolyte secondary cell having a high energy density and superior cyclic properties with a high safety aspect may be provided with markedly high commercial and industrial values.

What is claimed is:

1. A non-aqueous liquid electrolyte secondary cell comprising a positive electrode consisting of a compound of Li$_x$MO$_2$, where M is at least one transition metal and $0.05 \leq X \leq 1.10$, as an active material and lithium carbonate being added in an amount of 0.5 to 15 wt % to the positive electrode, and a negative electrode capable of being doped with lithium to enable releasing lithium, and current breaking means for breaking an electrical connection between a cell terminal and a cell electrode wherein the internal pressure within the cell is abnormally increased.

2. A non-aqueous liquid electrolyte secondary cell according to claim 1, wherein the specific surface area of lithium carbonate added to said positive electrode is not less than 0.1 m$^2$/g.

3. A non-aqueous liquid electrolyte secondary cell according to claim 1, wherein the compound Li$_x$MO$_2$ as the active material of the positive electrode has portions covered by lithium carbonate.

4. A non-aqueous liquid electrolyte secondary cell according to claim 1, wherein M is selected from Co and Ni.

5. A non-aqueous liquid electrolyte secondary cell comprising a positive electrode consisting of a compound of Li$_x$MO$_2$, where M is at least one transition metal and $0.05 \leq X \leq 1.10$, as an active material and means to prevent premature destruction of the cell comprising lithium carbonate being added in an amount of 0.5 to 15 wt % to the positive electrode; a negative electrode capable of being doped with lithium to enable releasing lithium; and current breaking means for breaking an electrical connection between a cell terminal and a cell electrode wherein the internal pressure within the cell is abnormally increased.

6. A non-aqueous liquid electrolyte secondary cell according to claim 5, wherein the specific surface area of lithium carbonate added to said positive electrode is not less than 0.1 m$^2$/g.

7. A non-aqueous liquid electrolyte secondary cell according to claim 5, wherein the compound Li$_x$MO$_2$ as the active material of the positive electrode has portions covered by lithium carbonate.

8. A non-aqueous liquid electrolyte secondary cell according to claim 5, wherein M is selected from Co and Ni.

* * * * *